United States Patent
Geyer et al.

(10) Patent No.: US 6,234,892 B1
(45) Date of Patent: May 22, 2001

(54) DEVICE FOR PRODUCING HOT AIR CURTAINS FOR DOOR OPENINGS IN LOCAL TRANSIT VEHICLE

(75) Inventors: Karl-Eberhard Geyer, Duesseldorf; Alfred Henatsch, Dresden, both of (DE)

(73) Assignee: Siemens Duewag Schienenfahrzeuge GmbH, Krefeld (DE)

( * ) Notice: Subject to any disclaimer, the term of this patent is extended or adjusted under 35 U.S.C. 154(b) by 0 days.

(21) Appl. No.: 09/367,327
(22) PCT Filed: Mar. 6, 1998
(86) PCT No.: PCT/DE98/00679
 § 371 Date: Aug. 11, 1999
 § 102(e) Date: Aug. 11, 1999
(87) PCT Pub. No.: WO98/41413
 PCT Pub. Date: Sep. 24, 1998

(30) Foreign Application Priority Data
Mar. 17, 1996 (DE) .............................................. 197 11 060

(51) Int. Cl.⁷ ....................................................... F24F 9/00
(52) U.S. Cl. ............................................. 454/188; 454/195
(58) Field of Search ............................... 454/188, 75, 95, 454/192, 195

(56) References Cited

U.S. PATENT DOCUMENTS

| 3,777,648 | * | 12/1973 | McGowan et al. | 454/188 |
| 4,581,988 | * | 4/1986 | Mattei | 454/188 |
| 4,896,829 | * | 1/1990 | Kawamura | 454/188 |

* cited by examiner

Primary Examiner—Harold Joyce
Assistant Examiner—Derek S. Boles
(74) Attorney, Agent, or Firm—Michael J. Striker

(57) ABSTRACT

A device for producing air currents at door openings provided for passing people in local transit vehicles has a unit for forming an air current which forms a barrier against penetration of cold air into a space disposed behind a door opening, the unit being formed so that the air curtain is provided above a bottom end of the door opening and is limited to a height between at least one third and at most half a total height of the door opening so as to prevent penetration of cold air only in a lower zone of the door opening.

12 Claims, 1 Drawing Sheet

DEVICE FOR PRODUCING HOT AIR CURTAINS FOR DOOR OPENINGS IN LOCAL TRANSIT VEHICLE

BACKGROUND OF THE INVENTION

The invention relates to the device for producing air currents at door openings, in particular of local transit vehicles, wherein the air curtain which forms a barrier against the penetration of cold air into the space disposed behind the door opening covers an area disposed between the bottom end of the door opening and a region disposed above this bottom end.

It is generally known that air curtains are used to prevent the penetration of cold air into heated or air-conditioned spaces. This kind of air curtains are generally found in public buildings, which include warehouses, for example. A disadvantage with the previous devices lies in the fact that they place an air curtain over the entire height of the door opening. Very large quantities of air are thus required which are difficult or impossible to produce on vehicles. It is also disadvantageous that the necessary high flow speeds cause annoyances for the people passing through the door opening. With a device of this kind, it would also be disadvantageous in vehicles that due to the available installation space, the air flow produced could only be directed from top to bottom, which could create annoyances because it might stir up dust from the street. Another disadvantage with the previously conventional devices is its inevitable noise nuisance due to the large quantities of air transported.

SUMMARY OF THE INVENTION

The object of the invention is to embody a device of this generic type with a view to the lowest possible structural cost and the limited installation space currently available in vehicles so that a penetration of cold air through the door opening that is found to be unpleasant is reliably prevented, wherein the device should function with smaller air quantities and to the greatest extent possible, should be noise-free and should not stir up dust.

This object is attained according to the invention by virtue of the fact that the air curtain above the bottom end of the door opening is limited to a height between at least one third and at most half the total height of the door opening.

In contrast to previous embodiments in which an air curtain is placed over the entire height of the door opening, according to the invention, only an air current of up to a maximal height of approximately half the door opening height is necessary. Trials using a vehicle with a door opening 200 cm high have confirmed that an air curtain of approximately 80 cm high inside the door opening comprises an effective dividing line for the penetration of cold air. A primary possibility for using the invention lies in local transit vehicles such as suburban rail cars and buses, whose doors are open more frequently and often for relatively long periods of time, wherein a comfortable interior climate is nevertheless maintained.

The air curtain is preferably produced by means of nozzle systems disposed laterally next to the door opening and therefore has a horizontal course, which for example prevents dust from being stirred up. Depending on the spatial installation conditions and the width of the door opening, the air curtain can be produced by means of a nozzle system disposed on the left and/or right next to the door opening. It is also advisable to produce the air curtain only when the door is open, i.e. in a vehicle, only when it is stopped. In order to be able to produce the air curtain in a simple manner without additional units, the proposal is made to use an already existing air conditioning device inside of building or vehicle. This air conditioning device should be equipped in a practical manner with a remote controllable air deflection, for example a louver, which is functionally coupled to the door control. Particularly for the case in which a building or vehicle does not already half the air conditioning device, a compact air current generator is provided to produce the air curtain, e.g. a small recirculatory blower, which is either turned on only when the doors open or continuously produces a hot air mass flow directed at the lower section of the door opening.

BRIEF DESCRIPTION OF THE DRAWINGS

The invention will be explained in detail below in conjunction with exemplary embodiments which are each schematically represented in the drawings.

DESCRIPTION OF PREFERRED EMBODIMENTS

Figure 1:
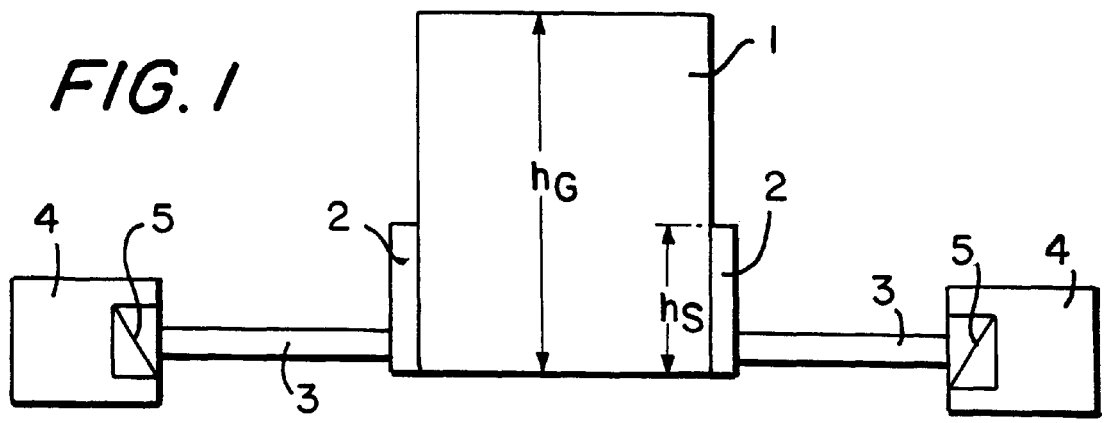
FIG. 1 is a view showing a system for producing a hot air curtain for a door opening in accordance with one embodiment of the present invention.

FIG. 1 shows the disposition of two nozzle systems 2 in a vehicle door opening 1 that has an overall height $h_G$ of 200 cm, for example. The nozzle systems 2 can be simply and if need be subsequently installed in conventional door pillar casings. The air flow required to produce the air curtain with a height $h_S$ of for example 80 cm inside the door opening 1 is taken from an air conditioning system 4 (ventilation device), which as a rule is disposed beneath a vehicle seat and is used to heat the interior. A louver 5 for air deflection, which is integrated into the air conditioning system 4, can be electrically actuated, and in terms of control, is synchronized with the door opening signal, conveys the air flow to the respective nozzle system 2 via an air hose 3 when the door is opened.

Figure 2:
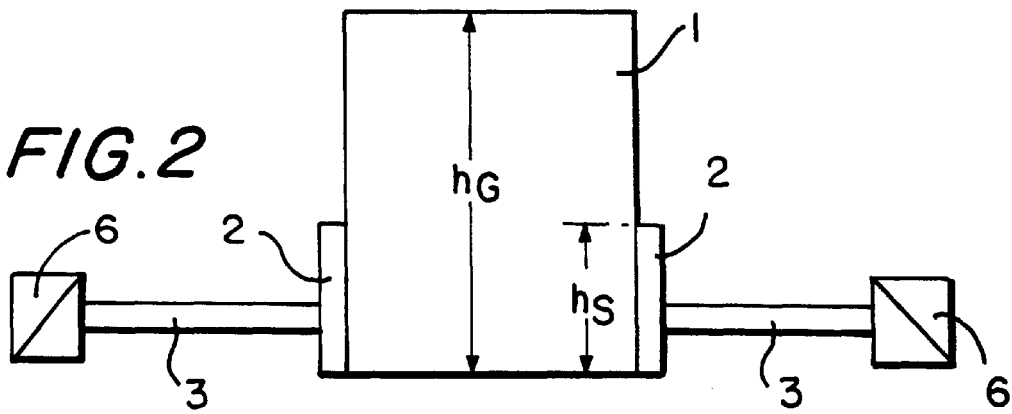
FIG. 2 is a view showing a system for producing a hot air curtain for a door opening in accordance with another embodiment of the present invention.

FIG. 2 shows a device that functions with separate, small recirculatory blowers 6. These recirculatory blowers 6 are switched on in a synchronized fashion by way of the door opening signal and are switched off again when the door closes.

Figure 3:
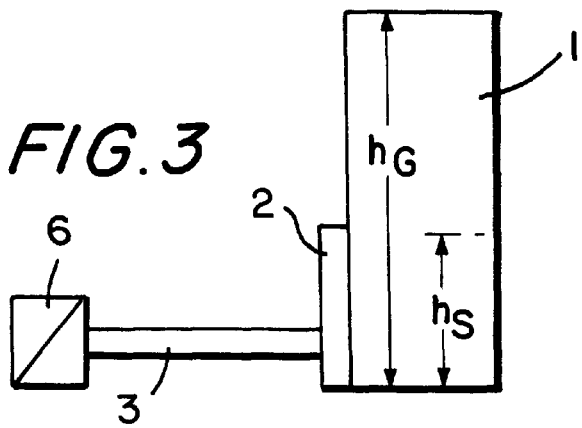
FIG. 3 is a view showing a system for producing a hot air curtain for a door opening in accordance with a further embodiment of the present invention.

FIG. 3 shows a device with only one nozzle system 2. This device primarily comes into consideration in small door widths or when there is not enough space for a nozzle system disposed on both the left and right sides next to the door opening 1.

Figure 4:
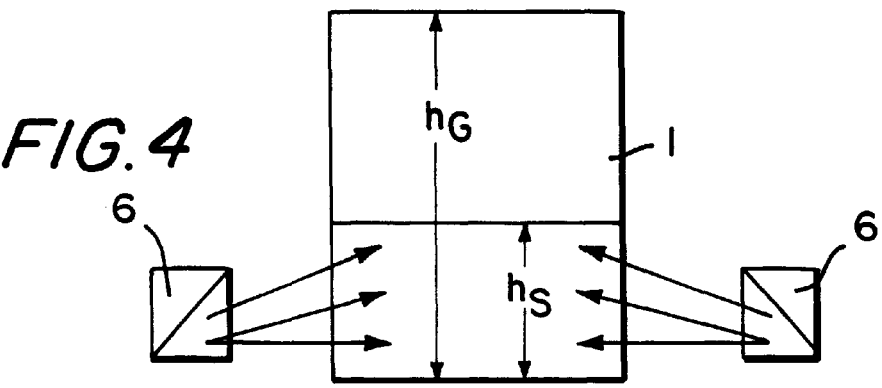
FIG. 4 is a view showing a system for producing a hot air curtain for a door opening in accordance with still a further embodiment of the present invention.

The device shown in FIG. 4 likewise operates with recirculatory blowers 4 whose hot air mass flow—depicted by the arrows—is continuously directed at the lower section of the door opening 1.

What is claimed is:

1. A device for producing air currents at door openings provided for passing people in local transit vehicles, the device comprising means forming an air curtain which forms a barrier against penetration of cold air into a space disposed behind a door opening, said means being formed so that the air curtain is provided above a bottom end of the door opening and is limited to a height between at least one third and at most half a total height of the door opening, so as to prevent penetration of cold air only in a lower zone of the door opening for passing people.

2. A device as defined in claim 1, wherein said means include a nozzle system which is disposed laterally next to the door opening and has a horizontal course.

3. A device as defined in claim 1, wherein said means includes a nozzle system disposed at at least one side selected from the group consisting of a left side and a right side, next to the door opening.

4. A device as defined in claim 1, wherein said means is formed so that the air curtain is only produced when a door is open.

5. A device as defined in claim 1, wherein said means is formed so that the air curtain is only produced when a vehicle is stopped.

6. A device as defined in claim 1, wherein said means include an air conditioning device.

7. A device as defined in claim 6, wherein said air conditioning device is provided with a remote controllable air deflection which is functionally coupled to a door control.

8. A device as defined in claim 7, wherein said remote controllable air deflection includes a louver.

9. A device as defined in claim 1, wherein said means include a compact air flow generator.

10. A device as defined in claim 9, wherein said compact air flow generator is a small recirculatory blower.

11. A device as defined in claim 9, wherein said air flow generator is formed so that it is switched only when a door is open.

12. A device as defined in claim 9, wherein said air flow generator is formed so that it continuously produces a hot air mass flow directed at a lower section of the door opening.

* * * * *